July 7, 1931.    A. C. FINNEY    1,813,796
CONTROL SYSTEM
Filed Nov. 30, 1928
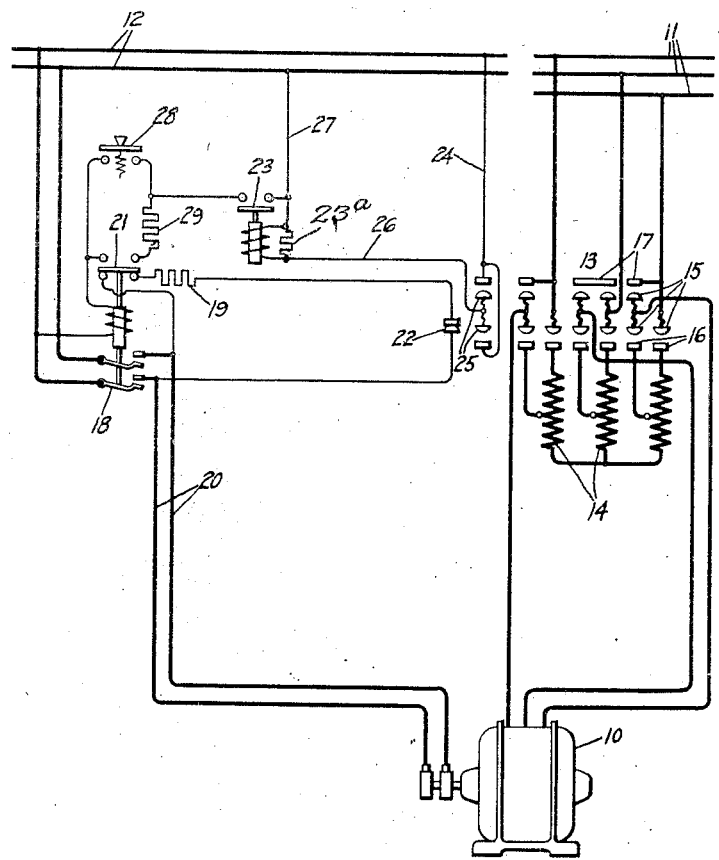
Inventor:
Alfred C. Finney,
by Charles V. Tullar
His Attorney.

Patented July 7, 1931

1,813,796

UNITED STATES PATENT OFFICE

ALFRED C. FINNEY, OF UPPER DARBY, PENNSYLVANIA, ASSIGNOR TO GENERAL ELECTRIC COMPANY, A CORPORATION OF NEW YORK

CONTROL SYSTEM

Application filed November 30, 1928. Serial No. 322,627.

My invention relates to the control of electric motors, more particularly to the control of alternating current synchronous motors, and has for its object the provision of a simple and efficient system of control for a synchronous motor whereby the motor field circuit will be maintained open during the starting period.

It has long been general practice to start a synchronous motor substantially as an induction machine, the field windings of the motor being disconnected from their exciting source during the starting period. In order to restrict the current inrush during the starting period, it has been customary to apply a reduced voltage to the stator windings and then, when the motor has attained substantially synchronous operating conditions, to apply the full running voltage. The reduced starting voltage may be obtained from autotransformers which are provided in many starting compensators of well known construction.

It will be understood that in starting, it is usually desirable to apply a voltage as low as the load torques will permit. Thus, where large starting torques are required and particularly, as will be evident, where starting compensators are employed, it is often desirable to start the synchronous motor with its field windings in an open circuit. It will be understood that other conditions being equal a larger starting torque will be developed by the motor with its field winding circuit open.

Heretofore it has been necessary to depend upon the operator to open the field discharge circuit during the starting period. Of course, this method of control possessed the undesirable feature that its success depended upon the skill and attention of the operator.

In one of its aspects, my invention contemplates the provision of a control system for a synchronous motor whereby the field circuit will be automatically opened when the motor is interconnected with its source of starting voltage.

In carrying my invention into effect in one form thereof, I provide means for controlling the local field circuit in accordance with the operation of the starting compensator so that when the compensator is operated to effect the application of the reduced starting voltage, the field circuit will be opened and when the compensator is operated to effect the application of the running voltage, the field circuit will be so controlled that it may be completed when the motor is deenergized.

For a more complete understanding of my invention, reference should be had to the accompanying drawing, the single figure of which is a diagrammatic representation of a system of control embodying my invention.

Referring to the drawing, I have shown my invention in one form in connection with an alternating current synchronous motor provided with a starting compensator. It will be understood that the synchronous motor 10 is provided with three phase armature windings on its stator member together with field windings mounted on a rotor member. It is believed unnecessary for a proper understanding of this invention to illustrate in detail the disposition of these windings since any preferred, well known arrangement may be employed. As shown, a suitable three phase source of alternating current supply 11 is provided for the armature windings of the motor and a suitable direct current source of supply 12 is provided for exciting the field windings of the motor.

In order to control the power connections for the synchronous motor, a suitable starting compensator 13 is interposed in the connections leading to the synchronous motor from the alternating current supply source 11. As shown, the starting compensator comprises a suitable auto-transformer 14, together with a switch member 15 operable between the low voltage transformer taps 16 and the full voltage taps 17. Thus, as will be evident, when the switch 15 is moved to its lower position the motor 10 will be connected through a portion of the auto-transformer to the supply source 11 and when the switch 15 is moved to its upper position the motor 10 will be connected directly to the supply source 11. It will be understood that the portions of the transformer through which the motor will be connected during the starting period will be adjustable by any suitable well known means. It will also be understood that usually the auto-transformer 14 and the switch 15 will be immersed in oil.

In order to control the excitation of the motor field windings, a suitable control switch 18, shown as an electroresponsive switch, is inserted in the connections leading to the field windings from the direct current supply source 12.

A suitable discharge resistor 19 is provided to be connected in a local circuit with the field windings when the motor 10 is deenergized. As shown, the resistor 19 is connected in a circuit across the supply conductors 20 which lead to the terminals of the motor field windings, the resistor circuit being under the control of an auxiliary switch or interlock 21 operably associated with the switch 18. Thus, when the switch 18 is opened the interlock 21 will be closed so as to establish the discharge circuit.

In order to open the field circuit in response to the operation of the starting compensator to interconnect the motor 10 with its low voltage source of supply, I provide a suitable switch member 22 in the field discharge circuit, this switch being arranged to be operated in accordance with the operation of the starting compensator 13. As shown, the movable contact of the switch 22 is connected to be operated by the compensator 13 and is so positioned that when the compensator is in its neutral position, the switch 22 will be closed to complete the field discharge circuit, and when the compensator is moved to its lower position so as to connect the motor to the supply source 11 through the auto-transformer, the switch 22 will be opened to interrupt the field discharge circuit. Thus, it will be observed that it will be impossible for the field windings to be connected through their discharge resistor 19 while the motor is being started.

In operation, the motor 10 will be electrically interconnected with its supply source through the auto-transformer 14 by movement of the switch 15 to its lower position. This movement of the switch 15 not only initiates the operation of the motor but also effects an operation of the switch 22 to open the field discharge circuit.

It will be observed that when the switch 15 has been moved to its lower position, an energizing circuit will be completed for the field relay 23, which circuit may be traced from the upper conductor of the supply source 12 through the conductor 24, the lower contacts of the switch 25 which will have been closed when the switch 15 was moved to its lower position, the conductor 26, the operating coil of the relay 23, and thence through the conductor 27 to the lower conductor of the supply source 12. This operation of the relay 23 effects no controlling action of the motor at this time but enables the field contactor 18 to be closed at the desired time.

When the synchronous motor 10 has obtained substantially synchronous operating conditions, the operator will apply the motor field by effecting an energization of the field contactor 18. To this end suitable control means, shown as a remotely located push button 28, is provided. As shown, when the push button 28 has been depressed, the field contactor 18 will be energized to close by means of an energizing circuit which may be traced from the lower conductor of the supply source 12 through the conductor 27, the field relay 23 which will have been closed when the switch 15 was moved to its lower position, the button 28 and thence through the operating coil of the contactor 18 to the upper conductor of the supply source 12. It will be observed that the interlock 21 associated with the contactor 18 will then be closed so as to establish a holding circuit for the operating coil of the field contactor. This holding circuit comprises a suitable resistor 29 so that the current flow through the operating coil will be limited while the motor is operating. Thus, it is but necessary to depress the button 28 momentarily in order to effect an energization of the motor field windings. It will be understood that any suitable means may be provided for informing the operator that the motor has attained substantially synchronous operating conditions so that he may excite the field windings at the proper time.

After the field windings have been excited by the operation of the push button 28, the operator will throw the switch 15 to its uppermost position whereby full running voltage will be applied to the motor 10. It will be observed that this operation of the switch 15 will close the switch 22 so that the local field circuit through the resistor 19 will be completed in the event the field contactor 18 be opened. It will be understood that the field relay 23 is provided with a time delay in opening so that the field contactor 18 will not be opened when the switch 15 is being thrown from its starting to its running position. As shown, a suitable time delay resistance 23a is connected in parallel with the relay coil so as to retard the opening of the relay. It will be understood that any other suitable timing means for the relay may be provided. Thus, the upper contacts of the switch 25 will be closed when the switch 15 is in its upper position so as to complete the energizing circuit for the field relay 23. If, however, the field contactor 18 be opened during the transition from low to high voltage by reason of the field relay 23 failing to function properly, the field windings will be protected through the discharge resistor 19. Also, should the field contactor 18 be opened by reason of the failure of its operating coil, as by burning, the field likewise will be protected through the discharge resistor.

It will be observed that it will be impossible to connect the resistor 19 directly across the line. Thus, when the field contactor 18 is opened, the interlock 21 will establish the local field discharge circuit and when the field contactor is closed, the interlock 21 will open the discharge circuit.

When it is desired to deenergize the motor, the compensator 15 will be moved to its neutral position at which position it is illustrated in drawing. This operation disconnects the motor 10 from its supply source and at the same time deenergizes the field contactor 18 by interrupting the energizing circuit for the field relay 23. Thus, the motor 10 will be brought to rest with its field windings connected through their discharge resistor 19.

It is to be noted that a very simple and efficient and yet absolutely safe system of control has been provided whereby the motor field circuit will be maintained open during the starting period of the motor.

While I have described my invention as embodied in concrete form and operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:

1. The combination with a synchronous motor having armature and field windings and means for connecting said field windings in a local circuit, of means for establishing power connections to the armature windings of said motor and means for opening said local circuit in response to the establishment of power connections to said armature windings.

2. The combination with a synchronous motor having armature and field windings, of means for connecting said field windings in a local circuit, means for establishing starting connections to said armature windings of said motor and means for opening said local circuit in response to the establishment of said starting connections.

3. A system of control comprising in combination with a synchronous motor having field windings, means for connecting said field windings in a local circuit, switching mechanism for establishing starting connections for said motor and switching mechanism operably associated with said starting switching mechanism operative to open said local circuit upon the establishment of said starting connections.

4. The combination with a synchronous motor having field windings and means for connecting said field windings in a local circuit, of switching mechanism for establishing starting and running connections for said motor and a switch inserted in said local circuit operably associated with said switching mechanism whereby said switch is opened upon the establishment of said starting connections and is closed upon the establishment of said running connections.

5. The combination with a synchronous motor having field windings and means for connecting said field windings in a local circuit, of a source of alternating current supply for said motor, means comprising an auto-transformer and a switch member for connecting said motor with said supply source through said transformer with said switch member in one position and for connecting said motor directly with supply source with said switch member in another position, and a normally closed switch included in said local circuit operably connected with said switch member whereby said switch is opened when said switch member is in said one position and is closed when said switch member is in said other position.

In witness whereof, I have hereunto set my hand this 27th day of November 1928.

ALFRED C. FINNEY.